Figures 1, 2:
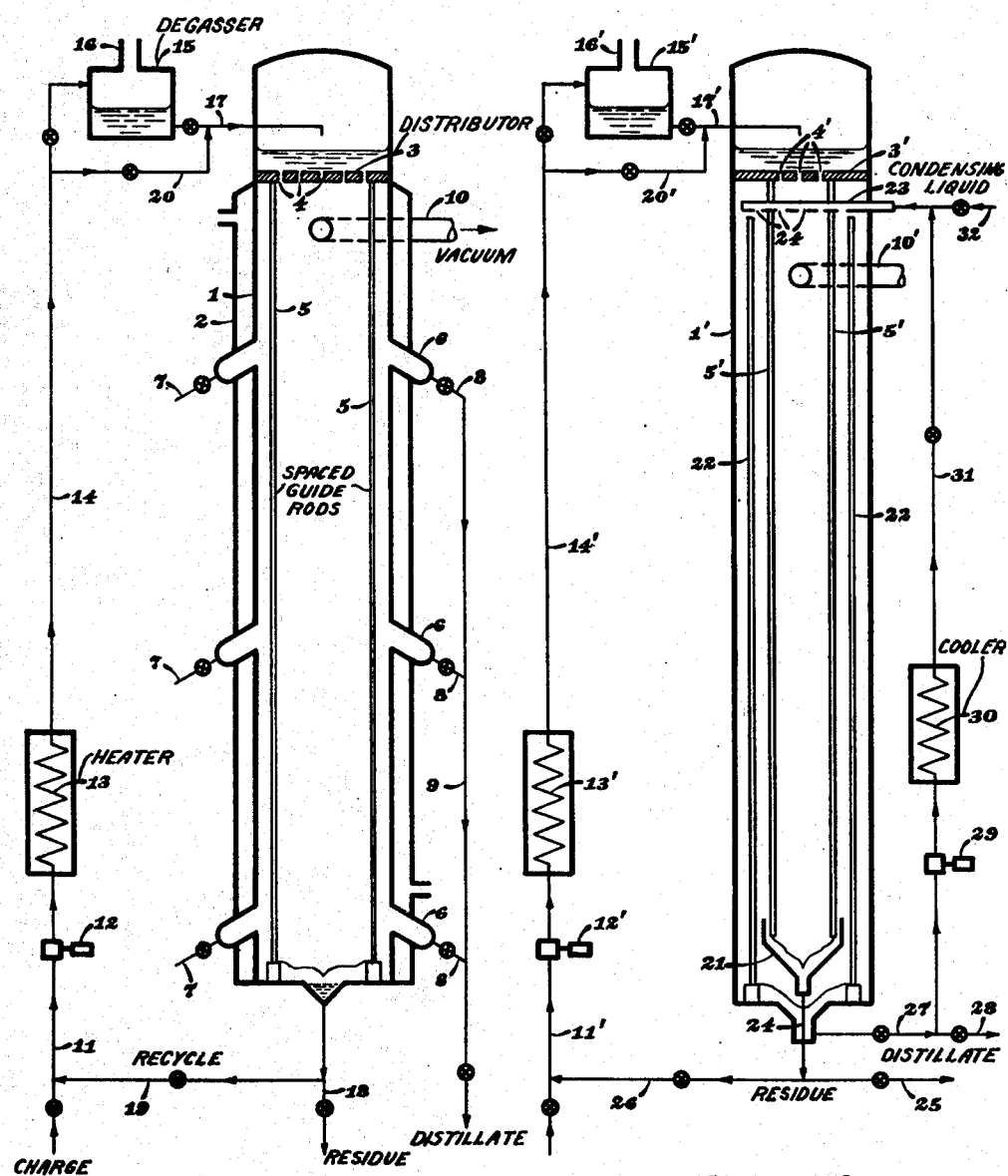

Inventors
Seymour W. Ferris
Edward R. Lamson
Douglas M. Smith

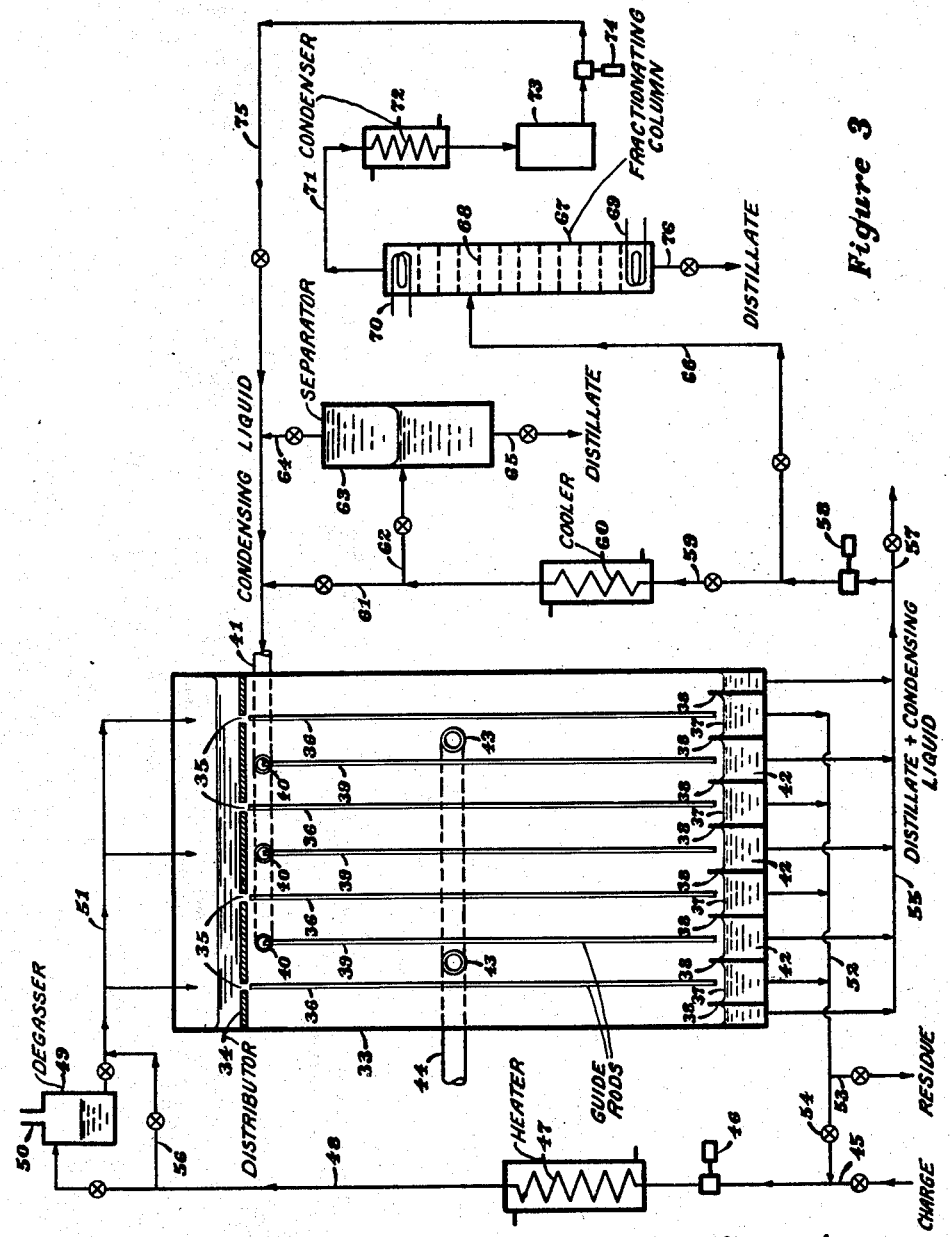

UNITED STATES PATENT OFFICE 2,514,943

GUIDED FREE FILM DISTILLATION APPARATUS

Seymour W. Ferris, Mount Holly, N. J., and Edward R. Lamson, Hatboro, and Douglas M. Smith, Norwood, Pa., assignors to The Atlantic Refining Company, Philadelphia, Pa., a corporation of Pennsylvania Original application January 29, 1945, Serial No. 575,106. Divided and this application March 23, 1946, Serial No. 656,745

5 Claims. (Cl. 202—236)

The present invention relates to a guided free film distillation apparatus, and relates more particularly to an apparatus for short path distillation of organic substances under reduced pressure.

This application is a division of our copending application Serial Number 575,106, filed January 29, 1945, which issued as United States Patent 2,447,746 entitled "Guided Free Film Distillation Method."

It has been proposed heretofore to carry out short path distillation under low pressure by providing a heated vaporizing surface and a condensing surface adjacent thereto, and supplying to the vaporizing surface, the material to be distilled. Since the vaporizing surface was invariably at a higher temperature than the material charged to it for vaporization, partial decomposition of the material usually resulted, with the attendant deposition of carbonaceous material upon the vaporizing surface, and this despite the very low pressures usually employed.

It has also been proposed heretofore to effect short path distillation under low pressure by jetting or spraying the material to be distilled between a source of radiant heat and a condensing surface, such material forming an unconfined spray or film capable of absorbing radiant heat in an amount sufficient to vaporize at least a portion of said spray or film. Since the material jetted or sprayed between the heat source and the condensing surface was unconfined, difficulty was encountered in controlling the spray or film and in preventing the unvaporized portions thereof from falling either upon the heat source or upon the condensing surface, and thereby decomposing upon the heat source or contaminating the distillate upon the condensing surface.

The above mentioned and other difficulties have been overcome in accordance with the present invention by supplying the heat of vaporization to the material to be distilled prior to forming same into a vaporizing film, thereby eliminating the use of a superheated vaporizing surface, and by guiding the vaporizing film of distillable material during its passage adjacent the condensing surface, thus avoiding contamination of the distillate with unvaporized material.

The apparatus of the present invention is adapted for use in the distillation of a wide variety of materials, and particularly in the evaporative or short path distillation of petroleum distillates, lubricating oils, residuums, petrolatum, wax, petroleum acids, and oils containing soaps such as the alkali and alkaline earth metal soaps of naphthenic and sulfonic acids. Examples of other materials to which the present invention may be applied with advantage are animal and vegetable oils, fats, waxes, and concentrates thereof, and organic mixtures containing therapeutically active materials. The present invention is also of advantage in separating and purifying hormones, vitamins, enzymes, and the like from materials containing them, such as fish oils, corn oil, cottonseed oil, wheat germ oil, fatty vegetable extracts, etc.

In accordance with this invention, the organic material to be distilled is brought to a vaporizing temperature and formed into a continuously flowing film which is guided through a distilling vessel in close proximity to and out of contact with a condensing surface, the pressure within the vessel preferably being subatmospheric. In its passage through the vessel, components of the film are vaporized and the resulting vapors are condensed and separately withdrawn from the vessel. Undistilled residual material is likewise separately withdrawn, and all or a portion thereof may be recycled for further distillation. The condensing surface employed may be a solid surface suitably cooled, or may comprise one or a plurality of guided films of condensing liquid of the same or different composition as the vapors to be condensed. When distillation is effected at very low pressures, the organic material to be distilled may be relieved of dissolved or occluded gas prior to introduction into the distilling vessel. While the present invention is particularly adapted for the distillation of materials at reduced pressure, such invention may also be applied in distillation at atmospheric or superatmospheric pressure.

The present invention may be further understood with reference to the accompanying drawing, in which Figures 1, 2, and 3 show diagrammatically apparatus suitable for carrying out the distillation process.

Referring to Figure 1, a vertical cylindrical chamber 1 enclosed in jacket 2 is provided with a partition 3 covering the cross-section of the chamber. The partition 3 is pierced with a plurality of apertures 4 extending in a line across the diameter of the partition. Disposed vertically within the chamber 1 are two guide rods 5 spaced horizontally from one another, one rod at each end of the row of apertures 4. On the side wall of chamber 1 are provided a plurality of annular troughs 6 spaced vertically from one another and extending completely around the chamber. The troughs are provided on one side with valve-controlled drawoff pipes 7 for withdrawing individual condensate fractions, and on the opposite side with valve-controlled drawoff pipes 8, each of which is connected to a valve-controlled manifold 9 for withdrawing all of the condensate fractions in one stream. At the upper section of chamber 1 below partition 3 is provided a relatively large diameter pipe 10 connecting with means for reducing the pressure within the chamber. Such means (not shown) may comprise any suitable vacuum pump such as a mercury vapor pump, steam ejector pump, mechanical vacuum pump or a combination of such pumps.

In operation, a distillable organic substance, for example, a viscous hydrocarbon oil is supplied from a source not shown through valve-controlled pipe 11 and is pumped by pump 12 through tubular heater 13 wherein the temperature of the oil is raised, for example, to 350° F. Since it is desired to conduct the distillation at a low pressure and since the charge oil contains dissolved or occluded gas, such oil after leaving heater 13 is delivered by valve-controlled pipe 14 to the degassing chamber 15 connected by pipe 16 to a vacuum pump not shown. The degassing chamber is of conventional design and operation, and requires no further description. The heated oil, in passing through the degassing chamber 15 is subjected to reduced pressure and is relieved of its dissolved gas and any highly volatile hydrocarbons which it may have contained. The heated, degassed oil is then passed from chamber 15 by means of valve-controlled pipe 17 into the upper or distributing section of distilling chamber 1 above the apertured partition 3. By regulating the rate of pumping a constant head of oil may be maintained above the partition while the oil is fed through the apertures 4 in a plurality of fine streams which coalesce immediately below the partition and form a thin film or sheet across the space between the guide rods 5. The chamber 1 is maintained at the desired reduced pressure, for example, 10 to 15 microns, by means of a vacuum pump connected through pipe 10. The heated oil continuously supplied to the rods 5 flows downwardly in a continuous film between rods 5, and during its passage a portion of the oil is vaporized by the contained heat and the vapors diffuse through the chamber, eventually coming into contact with the walls of the chamber and condensing thereupon. The chamber walls may be maintained at a suitable condensing temperature by circulating through the jacket 2 a cooling medium such as water or other agent. Since the most volatile constituents of the oil are the first to vaporize and diffuse from the film, the most volatile condensate will be drawn off from the uppermost trough 6, and the progressively less volatile condensates will be drawn off at the successively lower troughs. In the apparatus illustrated, 3 different condensate fractions may be obtained by drawing from valve-controlled pipes 7, or if desired, the condensates may be drawn from valve-controlled pipes 8 and combined into a single condensate in manifold 9, which condensate is then removed to storage not shown. The vaporizing oil film passing downwardly between rods 5 thus becomes progressively denuded of volatile constituents, and drains off the lower ends of the rods into the bottom of chamber 1 as undistilled residue. Such residual oil or "bottoms" is withdrawn from chamber 1 by means of valve-controlled pipe 18 and may be sent to storage, or all or a portion of such residue may be returned by means of valve-controlled pipe 19 to pipe 11 for recycling, to the distilling chamber, with or without fresh charge oil. In the event that the charge oil is relatively free of dissolved gas, the degassing chamber 15 may be by-passed and the heated oil introduced through valve-controlled pipes 20 and 17 into the distributing section of chamber 1. If the distillation is carried out at atmospheric or superatmospheric pressure, the degassing chamber likewise may be dispensed with. While the distillation chamber 1 referred to in Figure 1 has been described as being cylindrical, it is obvious that such chamber may be fabricated in other shapes, for example, chamber 1 may have an oval, square, or rectangular cross-section. Furthermore, in lieu of only two vertical guide rods 5, there may be employed a greater number of rods disposed in the same or different plane and providing means for establishing a continuous vaporizing film of considerable width. If desired the vertical rods may be so disposed as to form an oval, circle, square, or rectangle within the distilling chamber, with condensing surfaces disposed inside or outside, or both inside and outside of the oval, circle, square, or rectangle formed by the rods. Since the heat is supplied to the oil prior to the formation of the vaporizing film, the guide rods never acquire a temperature higher than that of the oil film which they guide. Therefore, decomposition of the oil and deposition of carbonaceous materials upon the rods is kept at a minimum.

Another modification of a distillation chamber and attendant equipment is illustrated in Figure 2 of the drawing.

Referring to Figure 2, a cylindrical chamber 1' is provided in its upper portion with a partition 3' extending over the cross-section of the chamber. The partition is provided with a plurality of apertures 4' extending in a line across the diameter of the partition. Suspended vertically from the partition adjacent the end apertures thereof are two guide rods 5' spaced horizontally from one another, the lower ends of which terminate within a collecting funnel 21. On either side of rods 5' and in a plane spaced horizontally from said rods, are a second pair of guide rods 22 extending upwardly from the bottom of chamber 1' and terminating beneath the partition 3'. Disposed above the ends of rods 22 and in the same plane is a pipe 23 provided with a plurality of apertures 24, the end of such pipe extending through the wall of chamber 1. At the upper section of chamber 1' below partition 3' is provided a relatively large diameter pipe 10' connecting with means for reducing the pressure within the chamber. Such means (not shown) comprises any suitable type of vacuum pump.

In operation, a distillable organic substance, for example, a crude residuum obtained from petroleum is supplied from a source not shown through valve-controlled pipe 11' and is pumped by pump 12' through tubular heater 13' wherein the temperature of the oil is raised, for example, to 400° F. Since it is desired to carry out the distillation at a very low pressure and since the charge oil contains dissolved gas, such oil after leaving heater 13' is delivered by valve-controlled pipe 14' to the degassing chamber 15' connected by pipe 16' to a vacuum pump not shown. The heated oil, in passing through the degassing chamber 15' is subjected to reduced pressure and is relieved of its content of dissolved gas. The heated, degassed oil is then passed from chamber 15' by means of valve-controlled pipe 17' into the upper or distributing section of the distilling chamber 1' above the apertured partition 3'. By regulating the rate of pumping, a constant head of oil may be maintained above the partition while the oil is fed through the apertures 4' in a plurality of fine streams which coalesce immediately below the partition and form a thin film or sheet across the space between the guide rods 5'. The chamber 1' is maintained at the desired low pressure, for example, 5 microns, by means of a vacuum pump connected through pipe 10'. The heated oil continuously supplied to the rods 5' flows downwardly in a continuous film between rods 5', and during its passage a portion of the oil is vaporized by the contained heat and the vapors diffuse through the chamber. To effect condensation of these vapors, a liquid having a low vapor pressure is supplied to distributing pipe 23 whence it is delivered through apertures 24 to guide rods 22, whereby there is formed a condensing liquid film flowing downwardly between rods 22. The condensing liquid, being at a lower temperature than the oil vapors, effects cooling and condensation of the vapors, the resulting oil condensate traveling downwardly together with the condensing liquid film. Since the vaporizing film between rods 5' and the condensing film between rods 22 are traveling parallel to one another and are in close proximity to but out of contact with one another, condensation of the vapors is efficiently carried out. The film of undistilled residue reaching the lower end of rods 5' drains therefrom into collecting funnel 21 and is withdrawn through pipe 24, and may be passed to storage through valve-controlled pipe 25. Or, all or a portion of the undistilled residue may be returned by means of valve-controlled pipe 26 to pipe 11' for recycling, with or without fresh charge oil, to the distributing section of chamber 1' above partition 3'. The condensing liquid film and the condensate dissolved or entrained therein, upon reaching the lower end of guide rods 22, drains therefrom into the bottom of chamber 1' and is withdrawn by means of valve-controlled pipe 27 and may be passed to storage or to further treatment through valve-controlled pipe 28. In the event that the condensing liquid consists of the oil condensate itself, a portion thereof may be passed from valve-controlled pipe 27 by means of pump 29 through cooler 30 and valve-controlled pipe 31 to the distributing pipe 23, the remainder being passed from the system through valve-controlled pipe 28. If, on the other hand, the condensing liquid comprises a low vapor pressure fluid other than the condensate, such fluid may be supplied from a source not shown by means of valve-controlled pipe 32. Should the distillation be carried out at atmospheric or higher pressures, the condensing liquid need not have a low vapor pressure, i. e., water or other fluids may be used. While, in Figure 2, only one condensing film has been shown it is, of course, desirable to provide a second condensing film on the opposite side of the vaporizing film. This may readily be accomplished by providing a second set of guide rods similar to rods 22 to guide the second condensing film, the condensing liquid distributing apparatus being similar to that already shown.

A further modification of apparatus suitable for carrying out the process of the present invention is illustrated in Figure 3 of the drawing, in which the distillation chamber is shown as an end view rather than as a side view as in Figure 2.

Referring to Figure 3, a rectangular chamber 33 is provided in its upper portion with a partition 34 extending over the cross-section of the chamber. The partition is provided with a plurality of series of apertures 35 extending transversely across the partition, each line or series of apertures being horizontally spaced from one another. Disposed vertically at each end of each series of apertures are guide rods 36, the lower ends of which terminate within alternate collecting channels 37 formed by partitions 38 extending transversely across the bottom of chamber 33. Also disposed vertically within chamber 33 between each of the sets of guide rods 36 and spaced horizontally therefrom, are a plurality of guide rods 39, one rod being placed at each end of each apertured distributing pipe 40, a plurality of which are connected to manifold 41. The guide rods 39 terminate within alternate collecting channels 42. At the mid-section of the back wall of chamber 33 are provided a plurality of relatively large diameter openings 43 connected to pipe 44, which in turn leads to a suitable means for evacuating chamber 33, such means comprising a vacuum pump not shown.

The distilling chamber 33 comprises, in effect, a rectangular vessel containing alternate sets of guide rods 36 and 39 for guiding alternate vaporizing and condensing films, respectively, the material to be distilled being supplied above apertured partition 34, and the condensing liquid being supplied through the apertured pipes 40. The condensing liquid and condensate is collected and withdrawn from channels 42, and the undistilled residue is collected and withdrawn from channels 37, as will be described in detail hereinafter.

In operation, a distillable organic substance, for example, a high viscosity hydrocarbon lubricating oil stock, is supplied from a source not shown through valve-controlled pipe 45 and is pumped by pump 46 through a heating means such as tubular heater 47 wherein the temperature of the oil is raised, for example, to 330° F. The heated oil is then passed through valve-controlled pipe 48 to degassing chamber 49 connected to a vacuum pump (not shown) by means of pipe 50. Herein, the hot oil is subjected to reduced pressure and the dissolved gases are removed. The degassed oil is passed from chamber 49 through valve-controlled manifold 51 into the upper section of distilling chamber 33 above the apertured partition 34. If the oil is already degassed or if the distillation was to be effected at atmospheric or higher pressure the degassing chamber may be dispensed with, and the oil delivered through valve-controlled pipe 56 to manifold 51. By regulating the rate of pumping, a constant head of oil may be maintained above the partition 34 while the oil is fed through the plurality of series of apertures 35 to the guide rods 36, thereby forming a plurality of continuously flowing vertical films guided by rods 36. The chamber 33 is maintained at the desired reduced pressure, for example, 50 microns, by means of a vacuum pump connected to pipe 44. During the passage of the guided oil films downwardly through the chamber 33, a portion of the oil is vaporized by its contained heat, and the vapors diffuse from the films into the chamber. The films of undistilled residue or "bottoms" reaching the lower ends of rods 36 drain from the rods into channels 37 and are withdrawn through manifold 52. The "bottoms" may be sent to storage through valve-controlled pipe 53, or all or any portion of such "bottoms" may be returned through valve 54 to pipe 45 for recycling, with or without fresh charge oil, to the distillation chamber for further distillation.

To effect condensation of the vapors diffused from the vaporizing films, a condensing liquid of low vapor pressure is supplied through manifold 41 to the apertured distributing pipes 40, and is fed from the apertures onto the rods 39, thereby forming a plurality of continuously flowing vertical condensing films guided by the rods 39. The condensing liquid, being at a lower temperature than the oil vapors, effects cooling and condensation of the vapors, the resulting condensate traveling downwardly together with the condensing film. The condensing liquid films and the condensate dissolved or entrained therein, upon reaching the lower ends of guide rods 39 drains therefrom into the channels 42 and is withdrawn therefrom through manifold 55. Depending upon the nature of the condensing liquid, various techniques may be applied in the handling thereof as follows:

In the event that the condensing liquid consists of the oil condensate itself, such liquid may be drawn from manifold 55 and a portion thereof passed to storage through valve-controlled pipe 57, while the remainder is delivered by pump 58 and valve-controlled pipe 59 to cooler 60, wherein the liquid is cooled to a suitable temperature and then supplied through valve-controlled pipe 61 to manifold 41 for reuse as condensing fluid.

On the other hand, if the condensing fluid is relatively immiscible with the oil condensate, the immiscible mixture after passing through cooler 60 is introduced through valve-controlled pipe 62 into settling vessel or separator 63 wherein the immiscible mixture of oil condensate and condensing liquid is permitted to settle and stratify into layers, the condensing liquid forming the upper layer if the specific gravity of such liquid is lower than that of the oil. The upper layer is continuously drawn off through valve-controlled pipe 64 and returned to manifold 41 for reuse as condensing liquid. The lower layer of oil condensate is drawn from the bottom of separator 63 by means of valve-controlled pipe 65 and passed to storage not shown. In the event that the oil condensate has a lower specific gravity than the condensing liquid, the connections will be reversed whereby the oil condensate is drawn from the top of the separator and the condensing liquid from the bottom of the separator for return to manifold 41.

Finally, if the condensing liquid is miscible or partially miscible with the oil condensate and has a boiling point or boiling range different than that of the oil condensate, the mixture or solution of oil condensate and condensing liquid is delivered by pump 58 through valve-controlled pipe 66 to fractionating or stripping column 67 provided with bubble trays 68, heating oil 69, and dephlegmating coil 70. Assuming that the condensing liquid has a lower boiling point or range than the oil condensate, the mixture in passing downwardly through the column is subjected to fractionation, the necessary heat being supplied primarily by the heating coil 69. The condensing liquid is vaporized and fractionated from the oil condensate, the vapors being taken overhead through pipe 71, condensed in condenser 72, and the resulting liquid stored in tank 73 from which it may be returned by pump 74 through valve-controlled pipe 75 to manifold 41 for reuse as condensing liquid. The oil thus separated by the fractionation operation may be drawn from the bottom of column 67, cooled, and passed to storage through valve-controlled pipe 76. On the other hand, if the condensing liquid is higher boiling than the oil condensate, the condensate will be vaporized and taken overhead and the condensing liquid will be drawn as bottoms.

In the operation of the distilling apparatus at low pressures, for example, 250 microns or less, it is necessary to employ condensing liquids having a relatively low vapor pressure at the condensing temperature, otherwise a low pressure could not be maintained in the apparatus. However, if the temperature of the condensing liquid film is very low, the actual boiling point of the condensing liquid is of little consequence, since its vapor pressure would necessarily be low. Suitable condensing liquids include the condensate, per se, whether it be hydrocarbon oil or other condensate produced by the distillation. Various other compounds may also be employed, such as glycerol, glycol, the polyglycerols and polyglycols, organic esters of the acids of phosphorus, phthalic acid esters of aliphatic and aromatic alcohols including ethyl hexyl phthalate, ethyl lactate, fatty oils, and the like. When the condensing liquid temperature is maintained at a low level, more volatile liquids may be utilized, including halogenated hydrocarbons, aliphatic alcohols, ethers, ketones, nitroparaffins, nitroaromatics, hydrocarbon distillates, gas oil, water, aqueous solutions of soluble salts, sugar solutions, etc.

The method of the present invention is applicable to the distillation of distillable organic substances at temperatures up to the decomposition temperature at the prevailing pressure. In general, evaporative distillation may be effected at temperatures up to 600° F., temperatures of the order of 250° F. to 400° F. being suitable for most hydrocarbon oils of substantial viscosity and boiling point, pressures being of the order of 100 microns or less, and preferably 10 microns or less. It is, of course, obvious that the distillation process may be carried out not only in a single continuous unit such as shown in Figures 1, 2, and 3, but also in a plurality of such units in series or parallel operation. In series operation the undistilled residue from the first unit may be subjected to further distillation in a second unit at the same temperature and at a lower pressure, or at a higher temperature at the same or lower pressure. The undistilled residue from the second unit may be charged to a third unit and the distillation continued, such process being repeated until further distillation becomes impractical.

While the present invention is particularly applicable to the evaporative distillation of organic compounds, for example, oils, fats, waxes, and resins, such invention may be likewise employed in the distillation of inorganic substances or mixtures, including sulfuric acid; phosphoric acid; sulfuric acid contaminated with hydrocarbons, hydrocarbon polymers, or esters; sulfuric or phosphoric acid sludge from the processing or refining of petroleum or other hydrocarbons; decomposable inorganic salt solutions, and the like.

The apparatus illustrated in Figures 1, 2, and 3 is, of course, capable of being modified in many ways in order to obtain the highest operating efficiency, depending upon the nature and properties of the material to be distilled. For example, depending upon the viscosity and the rate of charge of the material as well as the pressure under which the distillation is conducted, the width of the vaporizing film may vary from several inches to several feet. At low pressure, wider films may be employed, since there is less disturbance of the film, i. e., weaving or billowing, than at atmospheric or higher pressures. Furthermore, the length of the vaporizing film may vary from a few feet to 10 or 20 feet or more, depending upon the rate of charge and the volatility of the material. The strength of the vaporizing film may be increased by the addition of surface tension reducing agents such as soaps, fatty acids, and esters which may remain in the vaporizing film during distillation. Moreover, various means may be employed in distributing the material comprising the vaporizing film and the condensing film. For example, in lieu of a partition or pipe provided with a plurality of apertures as shown in Figures 1, 2, and 3, other means such as weires, dams, nozzles, or short tubes may be utilized. It, of course, will be apparent that the apertures 4 will be reasonably closely spaced and of relatively small diameter, depending upon the material to be distilled. In the example which follows, a series of $\frac{3}{32}$ inch diameter openings spaced on $\frac{1}{8}$ inch centers was employed.

The results obtained in the practice of the present invention are given in the following examples in which a viscous hydrocarbon oil, after degassing, was distilled in an apparatus similar to that shown in Figure 1 of the drawing, the entire oil condensate being taken as a single fraction. Such examples are illustrative only and are not to be construed as limiting the scope of the invention. The vaporizing film was 28 inches in length and 1⅝ inches in width, giving a total vaporizing surface of 0.632 square foot. The properties of the charge oil and the resulting distillate, as well as the operating conditions are tabulated below.

|  | Filtered Pennsylvania Residuum | |
|---|---|---|
| Charge Oil: | | |
| A. P. I. Gravity_____degrees__ | 30.0 | 26.9 |
| SU Vis./100° F_____seconds__ | 592 | 2,322 |
| SU Vis./210° F_____do____ | 61 | 148 |
| Volume charged___cubic centimeters__ | 4,140 | 4,140 |
| Distillation Temp., °F_____ | 210–260 | 290–352 |
| Distillation Pressure, microns_____ | 15 | 20 |
| Distillate: | | |
| A. P. I. Gravity_____degrees__ | 30.7 | 29.3 |
| SU Vis./100° F_____seconds__ | 116 | 235 |
| SU Vis./210° F_____do____ | 41 | 48 |
| Volume Distillate__cubic centimeters__ | 243 | 340 |
| Bottoms: | | |
| A. P. I. Gravity_____degrees__ | 28.7 | 26.6 |
| SU Vis./100° F_____seconds__ | 761 | 2,386 |
| SU Vis./210° F_____do____ | 61 | 151 |
| Volume Bottoms__cubic centimeters__ | 3,870 | 3,540 |

The apparatus of the present invention presents several advantages over the apparatus heretofore known to those skilled in the art. More particularly, the preheating of the material to be distilled prior to forming same into a vaporizing film and thus utilizing the contained heat to effect distillation avoids the use of internal heaters or solid heated surfaces which are prone to decompose the material to be distilled, thus causing deposition and accumulation of coke or carbonaceous substances upon the heating or vaporizing surfaces. Furthermore, the use of preheated guided free films for vaporizing surfaces, which films are not brought into contact with a heat-supplying surface after formation, not only avoids the decomposition and deposition of coke or carbonaceous substances, but for a film of given dimensions, provides double the vaporizing surface since vaporization takes place from both sides of the guided free film, whereas in films flowing over solid surfaces, vaporization may only take place from the surface not in contact with the solid.

We claim:

1. Evaporative distillation apparatus comprising a chamber, a plurality of guide rods vertically disposed within said chamber and horizontally spaced from one another a distance sufficient to support a free-flowing film of a distillable substance therebetween, distributing means having a series of apertures positioned above and extending between said guide rods for supplying thereto and forming therebetween a free-flowing film of a distillable substance, and means for separately collecting and withdrawing distillate and undistilled residue from said chamber.

2. Evaporative distillation apparatus comprising a chamber, a plurality of guide rods vertically disposed within said chamber and horizontally spaced from one another a distance sufficient to support a free-flowing film of a distillable substance therebetween, distributing means having a series of apertures positioned above and extending between said guide rods for supplying thereto and forming therebetween a free-flowing film of a distillable substance, condensing means in close proximity to and out of contact with said guide rods, means for collecting and withdrawing condensed distillate from said condensing means, and means for separately collecting and withdrawing undistilled residue from said chamber.

3. Evaporative distillation apparatus comprising a chamber, a plurality of guide rods vertically disposed within said chamber and horizontally spaced from one another a distance sufficient to support a free-flowing film of a distillable substance therebetween, a partition means having a series of apertures positioned above and extending between said guide rods for supplying thereto and forming therebetween a free-flowing film of a distillable substance, condensing means in close proximity to and out of contact with said guide rods, means for collecting and withdrawing condensed distillate from said condensing means, means for separately collecting and withdrawing undistilled residue from said chamber, and means for maintaining a subatmospheric pressure within said chamber.

4. Evaporative distillation apparatus comprising a chamber, a plurality of guide rods vertically disposed within said chamber and horizontally spaced from one another a distance sufficient to support a free-flowing film of a distillable substance therebetween, distributing means having a series of apertures positioned above and extending between said guide rods for supplying thereto and forming therebetween a free-flowing film of a distillable substance, condensing means in close proximity to and out of contact with said guide rods comprising a second plurality of vertically disposed guide rods horizontally spaced from one another a distance sufficient to support a free-flowing film of a condensing liquid therebetween, and distributing means having a series of apertures positioned above and extending between said second plurality of rods for supplying thereto and forming therebetween a free-flowing film of a condensing liquid.

5. Evaporative distillation apparatus comprising a chamber, a plurality of guide rods vertically disposed within said chamber and horizontally spaced from one another a distance sufficient to support a free-flowing film of a distillable substance therebetween, distributing means having a series of apertures positioned above and extending between said guide rods for supplying thereto and forming therebetween a free-flowing film of a distillable substance, condensing means in close proximity to and out of contact with said guide rods comprising a second plurality of vertically disposed guide rods horizontally spaced from one another a distance sufficient to support a free-flowing film of a condensing liquid therebetween, distributing means having a series of apertures positioned above and extending between said second plurality of rods for supplying thereto and forming therebetween a free-flowing film of a condensing liquid, means for collecting and withdrawing condensed distillate from said condensing means, and means for separately collecting and withdrawing undistilled residue from said chamber.

SEYMOUR W. FERRIS.
EDWARD R. LAMSON.
DOUGLAS M. SMITH.

REFERENCES CITED

The following references are of record in the file of this patent:

UNITED STATES PATENTS

| Number    | Name    | Date          |
|-----------|---------|---------------|
| 1,007,967 | Pampe   | Nov. 7, 1911  |
| 1,932,405 | Harris  | Oct. 31, 1933 |
| 2,370,462 | Heckler | Feb. 27, 1945 |